United States Patent
Nemeth et al.

(10) Patent No.: US 9,788,239 B2
(45) Date of Patent: Oct. 10, 2017

(54) WIRELESS TELECOMMUNICATION CELL DETECTION TECHNIQUE

(71) Applicant: SHARP KABUSHIKI KAISHA, Osaka-shi, Osaka (JP)

(72) Inventors: Zoltan Nemeth, Bracknell (GB); Gabor Jeney, Bracknell (GB); Sujith Chandran, Bracknell (GB); Shohei Yamada, Camas, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/781,800

(22) PCT Filed: Mar. 31, 2014

(86) PCT No.: PCT/JP2014/001879
§ 371 (c)(1),
(2) Date: Oct. 1, 2015

(87) PCT Pub. No.: WO2014/162723
PCT Pub. Date: Oct. 9, 2014

(65) Prior Publication Data
US 2016/0044543 A1    Feb. 11, 2016

(30) Foreign Application Priority Data
Apr. 3, 2013 (GB) .................................. 1306006.6

(51) Int. Cl.
*H04W 74/00* (2009.01)
*H04W 36/00* (2009.01)
*H04W 76/04* (2009.01)

(52) U.S. Cl.
CPC ... *H04W 36/0005* (2013.01); *H04W 36/0088* (2013.01); *H04W 76/04* (2013.01)

(58) Field of Classification Search
CPC . H04W 12/06; H04W 28/08; H04W 36/0005; H04W 36/0088; H04W 76/04;
(Continued)

(56) References Cited

U.S. PATENT DOCUMENTS 9,532,248 B2 * 12/2016 Worrall .................. H04W 48/16
2013/0040640 A1 * 2/2013 Chen ...................... H04W 36/30
455/434

(Continued)

FOREIGN PATENT DOCUMENTS

EP    2 482 587 A1    8/2012
GB    2498721 A       7/2013
(Continued)

OTHER PUBLICATIONS

Nokia Siemens Networks, Nokia Corporation, "Background inter-frequency measurement for small cell discovery", 3GPP TSG-RAN WG2 Meeting #81, Malta, Jan. 28-Feb. 1, 2013, R2-130451.

*Primary Examiner* — Mohamed Kamara
(74) *Attorney, Agent, or Firm* — Birch, Stewart, Kolasch & Birch, LLP

(57) ABSTRACT

The present arrangement relates to a method performed by a user equipment (UE), comprising applying different requirement for a concerned inter-frequency measurement if the UE receives instruction from an eNB. The requirement for the concerned inter-frequency measurement is different than ones for inter-frequency measurements other than the concerned inter-frequency measurement.

5 Claims, 8 Drawing Sheets

(58) Field of Classification Search
CPC ..... H04W 48/12; H04W 48/18; H04W 48/20;
H04W 72/02; H04W 72/04; H04W 72/06;
Y02B 60/50
See application file for complete search history.

(56) References Cited

U.S. PATENT DOCUMENTS

| | | | | |
|---|---|---|---|---|
| 2013/0273878 A1* | 10/2013 | Heo | ............... | H04W 28/02 |
| | | | | 455/405 |
| 2014/0171054 A1* | 6/2014 | Cai | ............... | H04W 76/04 |
| | | | | 455/418 |
| 2014/0171091 A1* | 6/2014 | Cai | ............... | H04W 48/20 |
| | | | | 455/450 |
| 2014/0334371 A1* | 11/2014 | Kim | ............ | H04W 52/0206 |
| | | | | 370/311 |
| 2014/0362716 A1* | 12/2014 | Zhang | ............ | H04W 24/10 |
| | | | | 370/252 |
| 2015/0004971 A1* | 1/2015 | Yilmaz | ......... | H04W 36/0083 |
| | | | | 455/434 |

FOREIGN PATENT DOCUMENTS

| | | |
|---|---|---|
| WO | WO 2008/052201 A2 | 5/2008 |
| WO | WO 2012/037476 A1 | 3/2012 |
| WO | WO 2012/047168 A1 | 4/2012 |

\* cited by examiner

FIG. 4e
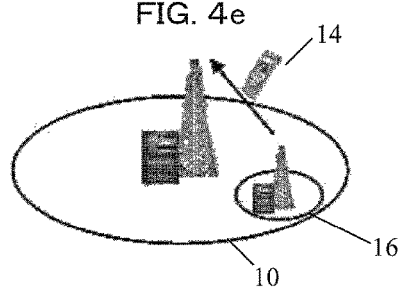
FIG. 4f
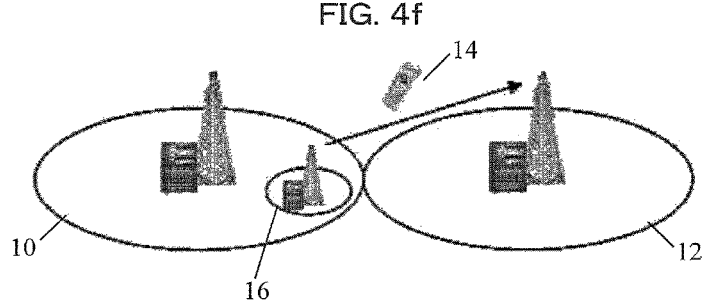
FIG. 5
Table 1
| Conditions | | Effect |
|---|---|---|
| *Serving/ neighbouring cell measurement condition* | *SCD parameters condition* | |
| N | N | None. |
| N | Y | Measurement is performed to meet measurement period requirement. |
| Y | Y | Measurement is performed to meet measurement period requirement. |
| Y | N | Measurement is performed to meet measurement period requirement. |

Table 2

| Gap Pattern Id | Measurement Gap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

FIG. 7

Table 3

| Gap Pattern Id | Measurement Gap Length (MGL, ms) | Measurement Gap Repetition Period (MGRP, ms) | Minimum available time for inter-frequency and inter-RAT measurements during 480ms period (Tinter1, ms) | Measurement Purpose |
|---|---|---|---|---|
| 0 | 6 | 40 | 6 | Inter-Frequency E-UTRAN FDD and TDD for a secondary measurement gap |
| 1 | 6 | 80 | 4 | Inter-Frequency E-UTRAN FDD and TDD for a secondary measurement gap |
| 3 | 6 | 20 | 60 | Inter-Frequency E-UTRAN FDD and TDD for a secondary measurement gap |

FIG. 8

Table 4

| Aspects | Cell Specific Solution | | Measurement Specific Solution | |
| --- | --- | --- | --- | --- |
| | Pros | Cons | Pros | Cons |
| Accuracy (in this case the location of the UE, e.g proximity of a small eNB) | No further control info is needed | Only CellID level position is known | CellIDs and e.g. TA can be used for higher accuracy | Relies on other procedures (e.g. random access) |
| Efficiency | Available for all UEs entering into a given cell | Transmitted information is unnecessary in many cases | No unnecessary information | Slight bandwidth consumption (lowers datarate) |
| Rapidity | Fast, SCD value stored in UE (after initial parameter read) | No special UE parameters are required to be defined or stored | No initial parameters transmission, relatively faster for frequent handovers | Parameter transmission is necessary for all SCD events |
| Flexibility | No information for handling dynamism | Fixed parameters, limited dynamism in operation | Dynamic operation, specific SCD values for each event | Additional information transmission to ensure flexibility |
| Amount of information to be transmitted | No information transmission in normal operation | Initial phase may require larger amount of data | Only the necessary small amount of information | UL and DL transmission for all SCD events |
| Required modification on the standard above common (e.g. SCD Periodicity parameter definition) modifications | Additional information only in the broadcast | SCD definition field can be large | No broadcast modification | Additional UL and DL messages have to be defined |
| Compatibility | Compatible with former Releases | Unnecessary parameters are transmitted - useless for older UEs | Compatible with former Releases | Increased amount of control info, bandwidth consumption from older UEs |

WIRELESS TELECOMMUNICATION CELL DETECTION TECHNIQUE

TECHNICAL FIELD

The present invention relates generally to a radio frequency measurement process for neighbour cells, and more specifically to an auxiliary measurement solution which may be used in preparing for, or assisting in, possible subsequent handover in a Long Term Evolution (LTE)-Advanced system. A particular implementation is for Traffic offloading to small cells within a HetNet network architecture in LTE-A. The arrangement is particularly suitable for a modified RRC measurement procedure to aid small cell deployment.

BACKGROUND ART

LTE-A or LTE Advanced is currently being standardized by the 3GPP as an enhancement of LTE. LTE mobile communication systems are being deployed from 2010 onwards as a natural evolution of GSM (registered mark) and UMTS.

The section below briefly discusses the network architecture of an LTE wireless communications network. Further details may be found at www.3gpp.org.

The base station—in E-UTRAN—for LTE consists of a single node, generally termed the eNodeB (eNB) that interfaces with a given mobile phone (typically termed user equipment, or user terminal). For convenience, the term UE—user equipment—will be used hereafter.

The eNB is the radio access part of the UMTS/LTE system. Each eNB contains a radio transmitter, radio receiver, a control section and a power supply. eNB functions include radio resource management—RRM, radio bearer control, radio admission control—access control, connection mobility management, resource scheduling between UEs and eNB radios, header compression, link encryption of the user data stream, packet routing of user data towards its destination (usually to the EPC or other eNBs), scheduling and transmitting paging messages (incoming calls and connection requests), broadcast information coordination (system information), and measurement reporting (to assist in handover decisions).

Each eNB is composed of an antenna system (typically a radio tower), building, and base station radio equipment. Base station radio equipment consists of RF equipment (transceivers and antenna interface equipment), controllers, and power supplies.

The eNB hosts the physical layer (PHY), Medium Access Control layer (MAC), Radio Link Control (RLC) layer, and Packet Data Control Protocol (PDCP) layer that include the functionality of user-plane header-compression and encryption. It also offers Radio Resource Control (RRC) functionality corresponding to the control plane. The evolved RAN performs many functions including radio resource management, admission control, scheduling, enforcement of negotiated up-link QoS, cell information broadcast, ciphering/deciphering of user and control plane data, and compression/decompression of down-link/up-link user plane packet headers.

Each eNB is associated with an area of coverage, usually termed a cell. When a UE moves between cells, the radio link between the UE and the network is passed between eNBs. This procedure is termed a handover.

Initially, LTE networks comprised a plurality of eNBs that provided network coverage. The cells associated with the eNBs in this network that have large cell radius (often a few kilometers, and typically >0.5 km), are referred to as macrocells. The cell in which the UE is currently attached is typically referred to as the serving cell.

Recently, the concept of heterogeneous networks (HetNet) has arisen. This type of network provides enhanced network performance by acknowledging that there is usually an unequal demand in various parts of the network. For example, office blocks, trains stations, and the like typically require much higher usage than other areas.

Thus, in heterogeneous networks, the current structure of eNBs will be complemented with a plurality of lower-power pico or femto eNBs that are deployed in areas of high demand. Such deployments should achieve significantly improved overall capacity and cell-edge performance in the network. These lower-power cells are often generically termed small cells.

In LTE networks, measurements for serving and neighbouring cells are performed according to how the network configures the UEs to perform the measurements. This may be based on well-defined events, for example when the serving cell signal level falls below a threshold. Serving cell measurements can be performed anytime. Whereas to measure cells on other frequencies, UE may require measurement gaps (gaps when UE is not using that receiver for listening to any other signals from other cells).

Measurement reports are sent from the UE to the network. The network specifies when the reports are to be sent. This may be periodical, or based on well-defined events (such as those defined in 3GPP TS36.331 Sec 5.5.4). It may also be a combination of event-based and periodic. Typically they are generated with given periodicities. These periodicities are 200 ms and 480 ms for serving cells and inter-frequency neighbouring cells.

LTE networks use a criteria called an s-measure. The s-measure is a value indicating to the UE when it should start measurement for neighbouring cells in preparation for a handover. If the UE determines that a cell's RSRP drops below a certain value (after L3 filtering), the UE will perform appropriate measurements of neighbouring cells on the frequencies and RATs indicated in the relevant measObject.

When the s-measure criteria is configured, the UE initiates neighbour cell measurements when said s-measure criteria is satisfied (that might eventually lead to the eNB triggering Handover procedure). The s-measure criteria is not suitable for detecting the presence of a small cell, as measurements, and hence handover to candidate small cell(s) will not be triggered if the UE is close enough to a macro eNB, and off-loading will not be performed.

The present invention has been devised with the above problems in mind, and in particular to propose changes to the criteria for triggering measurements to allow more straightforward off-loading of UEs to small cells.

Sections of the specification refer directly to the LTE technical specification. Full details may be found at www.3gpp.org.

SUMMARY OF INVENTION

One embodiment of the present invention discloses a method for performed by a user equipment (UE), comprising, applies different requirement for a concerned inter-frequency measurement if the UE receives an instruction from an eNodeB (eNB), wherein the requirement for the concerned inter-frequency measurement is different from ones for inter-frequency measurements other than the concerned inter-frequency measurement.

In order that the present invention be more readily understood, specific embodiments thereof will now be described with reference to the accompanying drawings.

BRIEF DESCRIPTION OF DRAWINGS

FIG. 4*a* shows examples of macro-cells and small cells, with UE movement there between.

FIG. 4*b* shows examples of macro-cells and small cells, with UE movement there between.

FIG. 4*c* shows examples of macro-cells and small cells, with UE movement there between.

FIG. 4*d* shows examples of macro-cells and small cells, with UE movement there between.

FIG. 4*e* shows examples of macro-cells and small cells, with UE movement there between.

FIG. 4*f* shows examples of macro-cells and small cells, with UE movement there between.

FIG. 5 shows Table 1.
FIG. 7 shows Table 3.
FIG. 8 shows Table 4.

DESCRIPTION OF EMBODIMENTS

Preferred Embodiments

Figure 1:
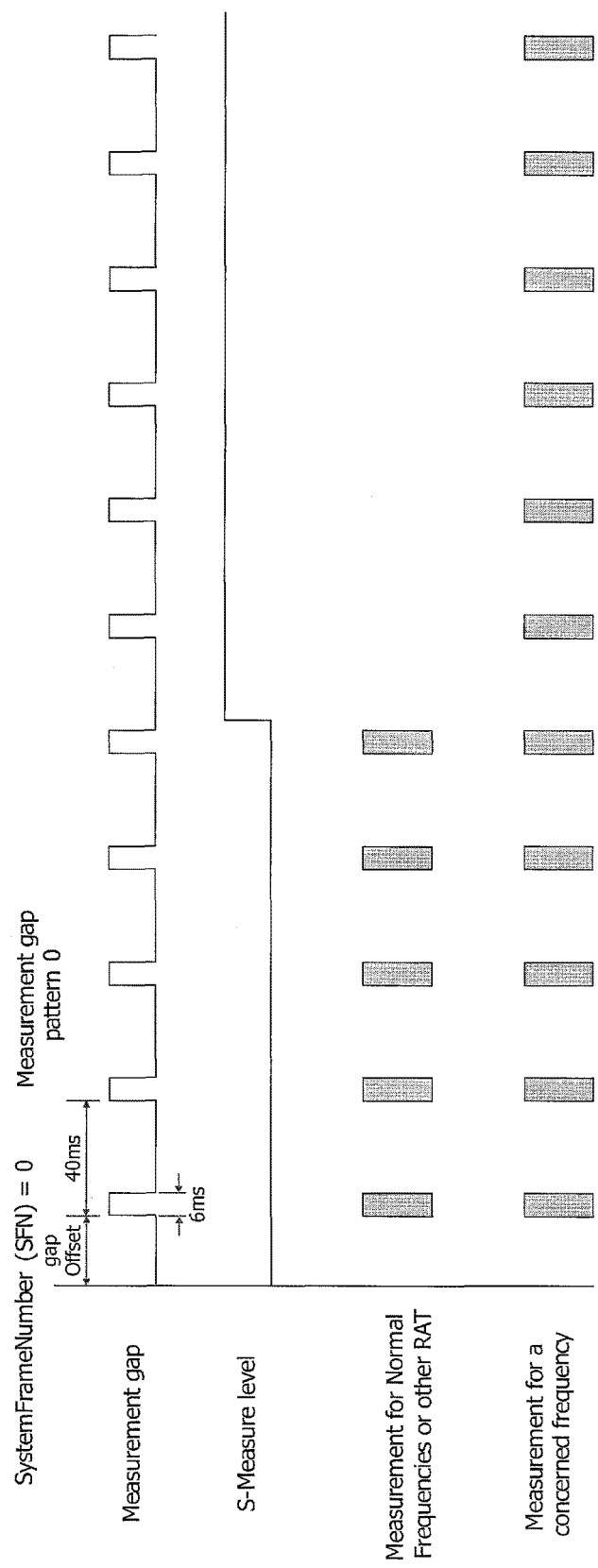
FIG. 1 shows a graph of a first implementation of SCD parameters by disabling the s-measure criteria.

The detailed description set out below references the LTE technical specification (TS). The TS may be found at www.3gpp.org.

The present invention relates to a mechanism for enhancing the procedure for performing measurements on neighbour cells to allow an UE's handover from a first cell to a second cell. The following embodiments typically refer to macro-cells and small cells. However, it should be appreciated that the present arrangement is also applicable to handover between any two cells, including two macro-cells, or two small cells.

In handover mechanisms, the LTE network relies on a number of measurements. Two of these are the Reference Signal Received Power (RSRP) and the reference signal received quality (RSRQ). The RSRP is a measurement of the signal strength of an LTE cell and aids ranking between different cells as input for handover and cell reselection decisions. The RSRP is the average of the power of all resource elements which carry cell-specific reference signals over the entire bandwidth. It can therefore only be measured in the OFDM symbols carrying reference symbols.

The RSRQ measurement provides additional information when RSRP is not sufficient to make a reliable handover or cell reselection decision. RSRQ is the ratio between the RSRP and the Received Signal Strength Indicator (RSSI), and depending on the measurement bandwidth, means the number of resource blocks. RSSI is the total received wideband power including all interference and thermal noise. As RSRQ combines signal strength as well as interference level, this measurement value provides additional help for mobility decisions.

In existing measurement arrangements, measurements of (and hence a handover to) a candidate small cell will not be triggered if an UE is close to a macro eNB. This is because the serving cell RSRP measurement will be too high; in other words there will be no prompting from the network for the UE to make measurements on adjacent cells in preparation for handover, even if those cells are suitable for handover. The present arrangement allows for an UE to make further specific measurements in certain condition, thus enabling more efficient small cell detection.

When the s-measure criteria is configured, the UE initiates neighbour cell measurements (that might eventually lead to the eNB triggering Handover procedure). The s-measure criteria is not suitable for a Small Cell Detection (SCD) procedure (as specified in Rel-11 HetNet), as handover to candidate small cell(s) will not be triggered if the UE is close enough to a macro eNB, and off-loading procedure will not be performed.

The present arrangement especially provides an auxiliary handover measurement mechanism to off-load UEs into cells (typically small cells) in the LTE network. As such, the term small cell detection (SCD) is used. The network will transmit SCD parameters to potentially allow UEs to be off-loaded onto small cells from macro-cells. This arrangement thus aids in reducing congestion in the network by off-loading UEs in hotspots onto dedicated small cells.

Particularly, the present arrangement may comprise a wireless telecommunications network comprising a macro-cell, a small cell located within the macro-cell, and a UE located in said small cell, wherein, said macro-cell comprises an eNB operable to communicate with said UE, wherein said eNB is operable to instruct said UE to make measurements for detecting the small cell by sending small cell detection parameters to said UE.

The present arrangement does not require continuous measurement by a UE for small cell detection. A UE is operable to begin SCD when a given conditions are met. A macro eNB is operable to transmit information to UEs in its cell about parameter(s) for specifying the condition of measurement performing. The mentioned parameter(s) may be valid for a specific UE or for all UEs in the cell.

The small cell detection (SCD) parameter can be cell specific and broadcast in a given cell in broadcast system information. Thus, in this arrangement the network will broadcast to each UE in a macro-cell that a small cell is available and appropriate UEs should make measurements on the small cell. This arrangement will off-load UEs from the macro-cell onto the small cell and potentially ease network congestion.

Alternatively, the SCD parameters may be UE specific by using dedicated RRC (radio resource control) signalling. A periodicity parameter may be given in the RRC measurement configuration. This parameter can be inserted into MobilityControlInfo information element (i.e., handover command) (TS 36.331) or MeasConfig information element (i.e., measurement configuration) (TS 36.331).

The SCD parameters may be measObject specific (i.e. specific carrier frequency).

The SCD parameters may be specific to any configured measurement object (i.e. any carrier frequency). The SCD parameters may be specific to a particular cell (i.e. a cell in neighbour cell list in measObject). MeasObject specific SCD parameters are advantageous because they save power and bandwidth, compared with cell specific SCD parameters.

A cell specific SCD is advantageous in aspect of filtering other cells' noises.

A discussion of how the small cell detection parameters are set will now be provided.

The SCD parameters are set if 1) their conditions are fulfilled, and 2) appropriate neighbour cells are present. Typically, SCD parameters will be set if a macro-cell comprises one or more small cells located therein.

The resource schedule aspect of the eNB decides on SCD parameters. Therefore any appropriate conditions can be enforced, as long as the resource scheduler decides it applicable. The basis of differentiation between the serving cell and the potential small cell is the frequency used by the small cell. The eNB may set SCD parameters based on the UE's capabilities: for example, the eNB may allow the UE to make additional measurements depending on whether or not the UE supports specific parameter settings, or whether or not the UE supports the frequency used by the target small cell.

The network will define an SCD parameters field. This will be used as a control information message. The SCD parameters field may include the frequency (or small cell identification) and parameter (periodicity and duration) assignments for the SCD parameters. For example, a measurement object defines the frequency.

Other parameters defined in the SCD parameters field may be included in the measObject configuration. For example, one parameter may be 1-bit of information defining whether or not the s-measure is applied for a given frequency. This allows the possibility for disabling the s-measure criteria for a particular frequency, so that even if the signal strength of the serving cell is good, the UE will instigate measurements for neighbouring cells. This will allow easier identification of small cells located within macro-cells, and hence greater chance of off-loading UEs in hotspots to small cells.

Other parameters may be additional measurement gap periodicity and pattern. For example, the introduction of less frequent measurements than a normally configured gap pattern when the serving cell has a good signal strength. An advantage of this arrangement is that, because the UE is not performing significant numbers of measurements when the serving cell signal strength is strong the battery life of the UE battery is conserved. However, the arrangement does allow for the possibility for detection of small cells embedded within the serving macro-cell.

The mobility of the UE and the location of the small cell zones may also be considered as parameter setting conditions. If a UE is travelling quickly through a (serving) macro-cell, it would not be advantageous to the network to try to off-load the UE to a small cell.

Based on a UE's speed (sometimes referred to as its mobility state) and the UE's location with respect to small cells, the eNB of the serving cell may decide to set SCD parameters. For example, the initial value of SCD parameter is the macro-cell default (for instance, when a UE enters into the given macro-cell). A new value may be set when a UE enters into a different small cell zone. This means only a follow-up solution but the UE is assumed not to change small cell zones frequently, which can be achieved by proper small cell zone configuration by the operator.

Figure 4A:
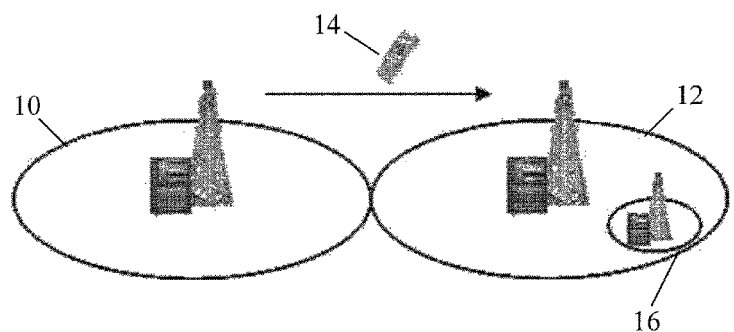
Figure 4B:
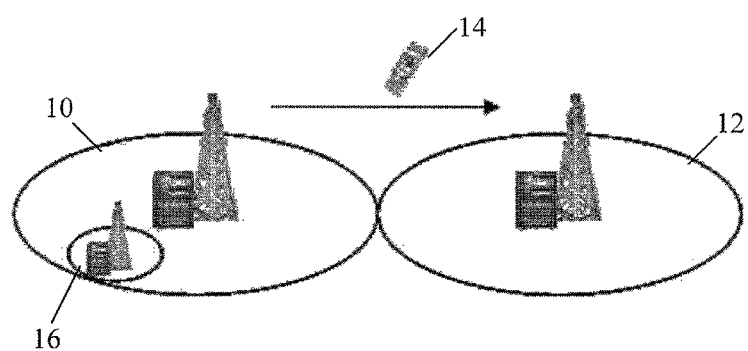
Figure 4C:
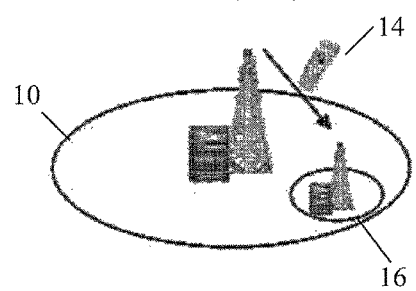
Figure 4D:
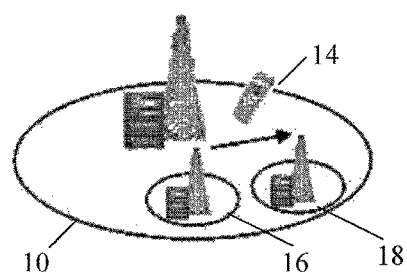

The operation of the SCD parameter and measurement performing procedure can be illustrated in the following few Rel-11 inter-frequency scenarios. The cell arrangement (macro, small), UE movement and the presence of SCD parameters in each cell is shown in FIG. 4a-FIG. 4f. In the various cases there is shown a first macro-cell 10 and a second macro-cell 12 (FIG. 4a and FIG. 4b). All of the scenarios show a UE 14, and a first small cell 16. Scenario 4d shows a second small cell 18.

The operation in the different scenarios can be explained as follows:

Scenario 1 (FIG. 4a): UE moves from a first macro-cell 10 to a second macro-cell 12. In this arrangement the UE 14 will be handed over from the first macro-cell 10 to a second macro-cell 12 as per standard procedure. No SCD parameters are signalled at the eNB of the first macro-cell, because no small cells are within range. In the second macro-cell (target cell) 12, SCD parameters applied by the eNB of the second macro-cell as there is a small cell 16 within second macro-cell 12. Normal handover procedure with HO command with the SCD parameter of second macro-cell 12 is performed using the s-measure criteria Scenario 2 (FIG. 4b): There is valid SCD parameter signalling in the serving macro-cell 10, but the target macro-cell has no small cells in the coverage area, and hence SCD parameter signalling is not appropriate is signalled. After the handover between the first macro-cell 10 to a second macro-cell 12 (based on the s-measure criteria), the SCD parameters held by the UE 14 is released.

Scenario 3 (FIG. 4c): The UE 14 moves from a macro-cell 10 to a small cell 16. SCD parameters is used to trigger the off-load. After the small cell 16 is found, the handover is triggered and the SCD parameters are released.

Scenario 4 (FIG. 4d): The UE 14 moves from a first small cell 16 to a second small cell 18. Neither the source nor target cell SCD parameter is defined. Handover procedure is based on the s-measure criteria.

Scenario 5 (FIG. 4e): The UE 14 leaves the coverage area of a small cell 16 (no other small cells are located within the coverage of macro-cell 10). A handover is performed based on the s-measure criteria. SCD parameter is signalled by HO command; SCD parameter is applied by the eNB of the macro-cell after handover to the macro-cell. Thus, if the UE 14 reverts back towards the small cell 16, the eNB of the macro-cell is operable to instruct the UE 14 to make measurements on the small cell 16 so that the UE 14 may be off-loaded onto the small cell.

Scenario 6 (FIG. 4f): The UE 14 leaves the coverage area of a small cell. Normal handover is performed based on the s-measure criteria. SCD periodicity parameter is not signalled in the target macro-cell 12, therefore SCD parameter is released after the successful handover.

The use of SCD parameter is not restricted to above scenarios. The small cell SCD indication is undesired as the UE can be unnecessarily handed over to other small cell. However, in order to detect macro-cell early for safety, SCD parameters can be useful.

The following section discusses the implementation of the present arrangement, and particularly how the small cell detection parameters may be used in operation.

According to existing arrangements, a UE will perform measurements when:
 the normal measurement condition for serving cell measurement is met:
 whenever the UE has a measConfig, UE shall perform RSRP and RSRQ measurements for each serving cell.
 the normal measurement condition for neighbour cell measurement is met:
 if a measurement gap configuration is setup; or
 if the UE does not require measurement gaps to perform the concerned measurements:
 if s-Measure is not configured; or if s-Measure is configured and the PCell RSRP, after layer 3 filtering, is lower than this value.

The present arrangement adds the further condition:
the SCD parameters' condition (that SCD parameters are configured in the concerned measurements) is met.

According to the two conditions the possible effects are shown in Table 1 (see FIG. 5). The second column in table 1 adds the additional measurement opportunities of the present arrangement.

One example of SCD parameters' condition is a disabling s-measure for a concerned measObject (i.e. a concerned frequency) as FIG. 1. FIG. 1 illustrates the relationship between the s-measure level, the measurement gaps and the UE measurement for standard frequencies and for specific frequencies for small cells to which the UE may be off-loaded. The fourth row of FIG. 1 illustrates the enhancements to current arrangements by the present invention.

The first row shows a measurement gap pattern. The second row shows the s-measure level. It will be appreciated that the s-measure level increases part way along the row. The third row shows a measurement pattern of a UE using current systems. When the s-measure is over a threshold value, no measurements are taken.

The fourth row of FIG. 1 shows that, in the present arrangement, the UE may continue to make measurements irrespective of the level of the s-measure.

In this arrangement, the following modification is required in the 3GPP TS 36.331 document:
In subsection 5.5.3.1:
. . .
2> else:
3> if a measurement gap configuration is setup; or
3> if the UE does not require measurement gaps to perform the concerned measurements:
4> if s-Measure is not configured; or
4> if s-Measure is configured and the PCell RSRP, after layer 3 filtering, is lower than this value;
4> if s-Measure is configured and the PCell RSRP, after layer 3 filtering, is not lower than this value and a disabling s-Measure in the concerned measObject is setup:
perform the corresponding measurements of neighbouring cells on the frequencies and RATs indicated in the concerned measObject, applying for neighbouring cells on the primary frequency the time domain measurement resource restriction in accordance with measSubframePatternConfigNeigh, if configured in the concerned measObject;

Another example of SCD parameters is the use of a secondary measurement gap configuration. This arrangement is a modification of the arrangement show in FIG. 1.

Figure 2:
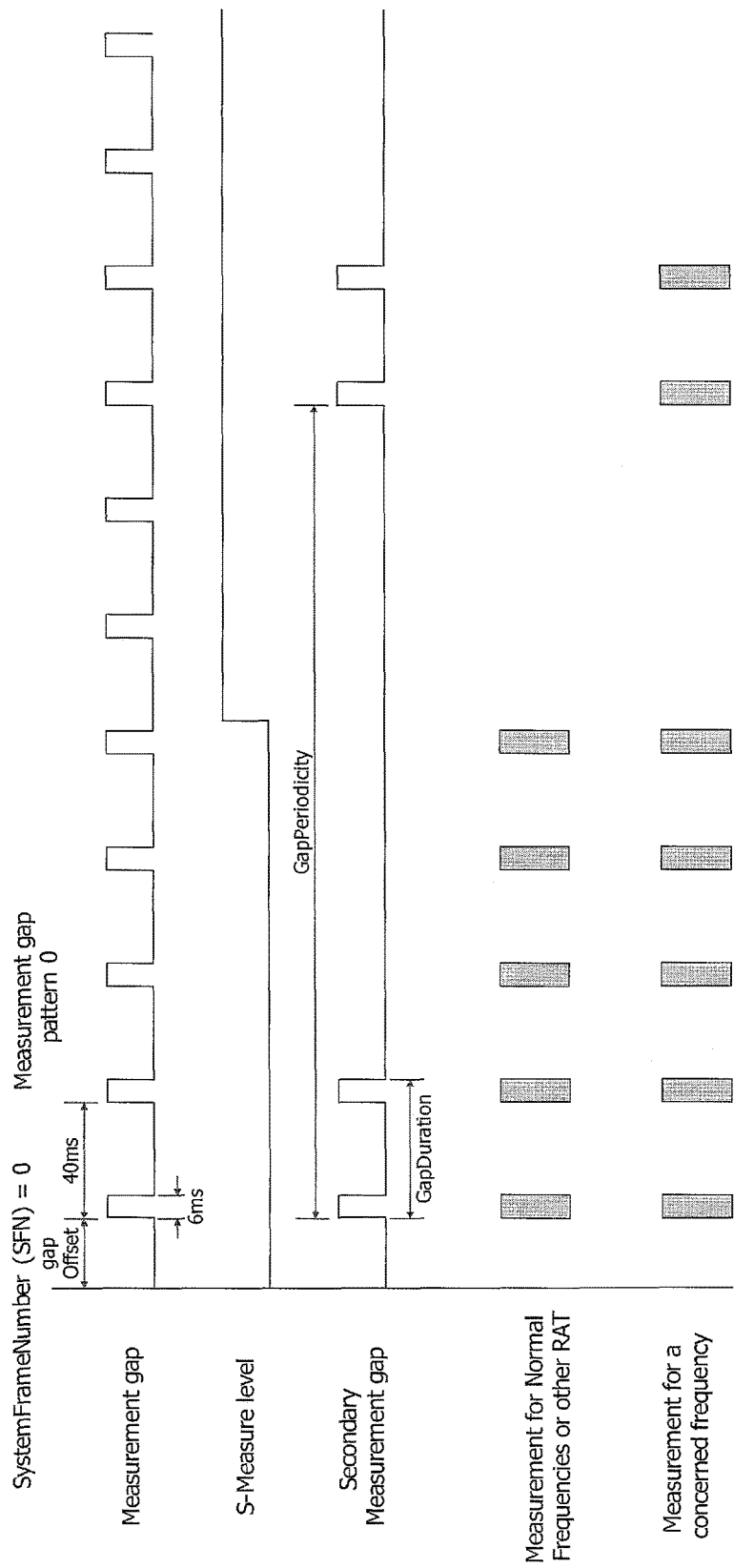
FIG. 2 shows a graph of a second implementation of SCD parameters by disabling the s-measure criteria and providing secondary measurement gaps.

The secondary measurement gap can be configured independent of, or supplemental to, the normal measurement gap. This is shown in FIG. 2. This arrangement allows for less frequent measurements than the normal configured gap patterns for neighbour cells when the serving cell signal strength is strong. The parameters (i.e., measGapConfig2, secondgapPeriodicity and secondarygapDuration) are signalled from the eNB to the UE and configured to the UE. The message structure of measGapConfig2 may include secondgapPeriodicity and secondarygapDuration.

Thus, in FIG. 2, the first, second and fourth rows show the current standard system. Row five shows that a UE may make measurements on neighbour cells, irrespective of the s-measure (see row 2). The third row shows the secondary measurement gap, and particularly the gap duration and the gap periodicity. As will be seen, even when the s-measure criteria is not satisfied (level high in FIG. 2, indicating serving cell at a higher signal level than threshold of s-Measure criteria), the UE may make measurements, but at a less frequent rate than when the s-measure is satisfied (below a particular level in FIG. 2, indicating serving cell at a lower signal level than a threshold of s-Measure criteria).

This arrangement conserves battery life for the UE's battery by limiting the number of measurements while the UE has good serving cell signal strength, but allows for the UE to search for small cells.

Figure 3:
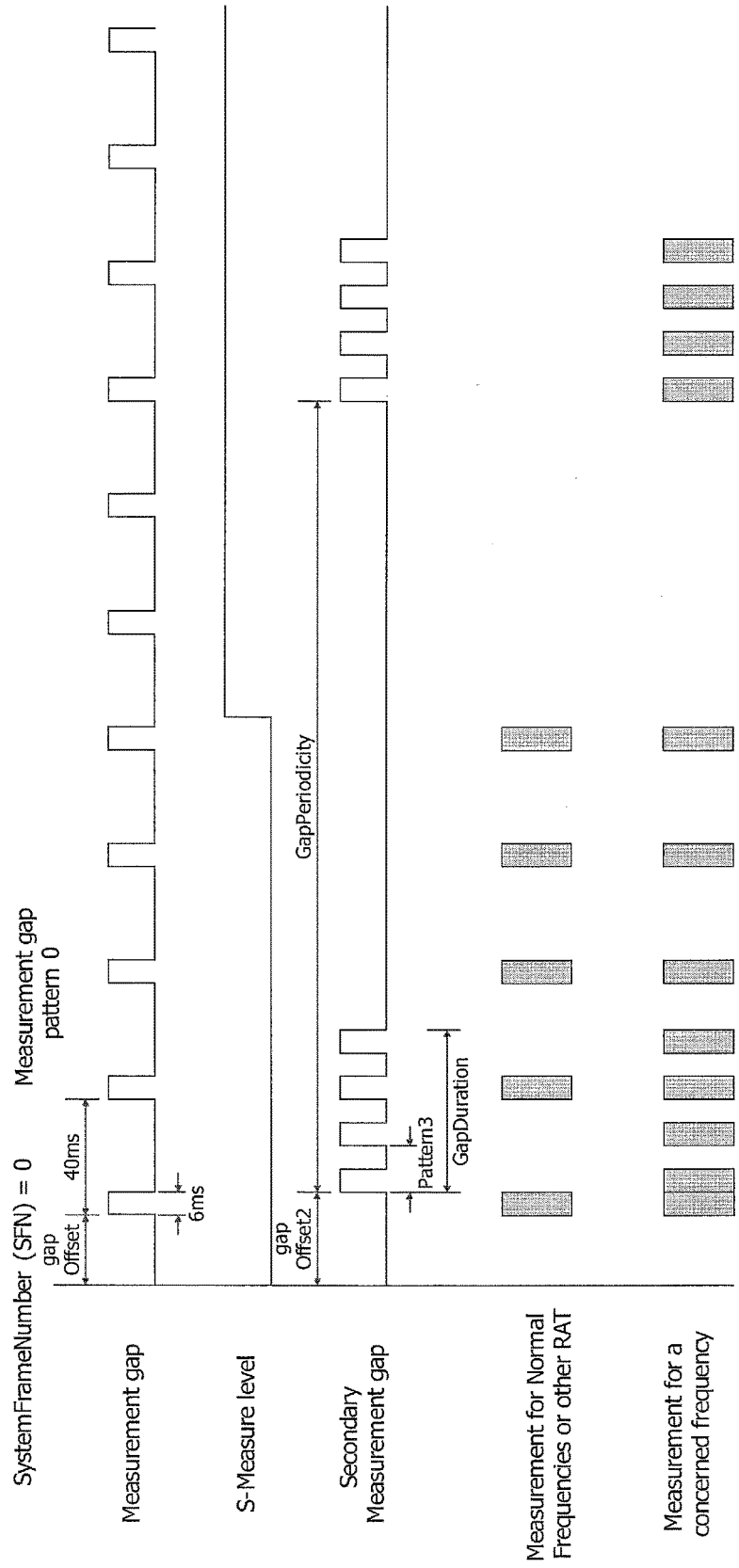
FIG. 3 shows a graph of a variant of the second implementation of SCD parameters.

The secondary measurement gap can be independently configured from the normal measurement gap. An example is shown in FIG. 3. This arrangement provides for the possibility for less frequent measurements as in the arrangement of FIG. 2, but also for more frequent measurements when the serving cell falls below the s-measure threshold. This arrangement is advantageous in that it aids the UE to rapidly find small cells rather than relying upon standard measurement gaps. This arrangement also helps to conserve UE battery life by limiting the number of measurements while the UE has a good signal strength from the serving eNB.

In this arrangement for FIG. 2, the following modification is required in 3GPP TS 36.331 document:
In subsection 5.5.3.1:
. . .
2> else:
3> if a measurement gap configuration is setup; or
3> if the UE does not require measurement gaps to perform the concerned measurements:
4> if s-Measure is not configured; or
4> if s-Measure is configured and the PCell RSRP, after layer 3 filtering, is lower than this value;
4> if s-Measure is configured and the PCell RSRP, after layer 3 filtering, is not lower than this value and a secondary gap configuration in the concerned measObject is setup:
perform the corresponding measurements of neighbouring cells on the frequencies and RATs indicated in the concerned measObject, applying for neighbouring cells on the primary frequency the time domain measurement resource restriction in accordance with measSubframePatternConfigNeigh, if configured in the concerned measObject;
4> . . .
And in subsection 5.5.2.9:
1> if measGapConfig is set to setup:
2> if a measurement gap configuration is already setup, release the measurement gap configuration;
2> setup the measurement gap configuration indicated by the measGapConfig in accordance with the received gapOffset, i.e., each gap starts at an SFN and subframe meeting the following condition:
SFN mod T=FLOOR (gapOffset/10);
subframe=gap Offset mod 10;
with T=MGRP/10 as defined in TS 36.133 [16];
2> if measGapConfig2 is set to setup:
3> if a secondary measurement gap configuration is already setup, release the secondary measurement gap configuration;
3> setup the secondary measurement gap configuration indicated by the measGapConfig2 in accordance with the received secondgapPeriodicity and secondarygapDuration, i.e., each secondary gap starts at an SFN and subframe meeting the following condition:
SFN mod T*secondgapPeriodicity−i*T=FLOOR(gapOffset/10);
subframe=gapOffset mod 10;
i={0,1,secondarygapDuration−1};
with T=MGRP/10 as defined in TS 36.133 [16];

By this formula, because gapOffset is shared by measurement gap and secondary measurement gap, each measurement opportunity of secondary measurement gaps is aligned with the normal measurement gap and falls into the normal measurement gap as FIG. 2. The consecutive measurement opportunities occur in every secondary gap periodicity. Secondary gap duration defines the consecutive measurement opportunities within the normal measurement opportunities and remaining normal measurement opportunities which are not used as measurement opportunities for the secondary measurement gaps as FIG. 2.

Measurement may be performed at any time provided the measurement period requirement is met, as follows: if the UE requires measurement gaps to identify and measure inter-frequency and/or inter-RAT (radio access technologies) cells, in order for the requirements to apply, the E-UTRAN must provide a single measurement gap pattern with a constant gap duration for concurrent monitoring of all frequency layers and RATs in case secondary measurement gaps are not configured.

Inter-frequency and inter-RAT measurement requirements rely on the UE being configured with a single measurement gap pattern, unless the UE has signalled that it is capable of conducting such measurements without gaps, or the UE has been signalled regarding a secondary measurement gap configuration.

Figure 6:
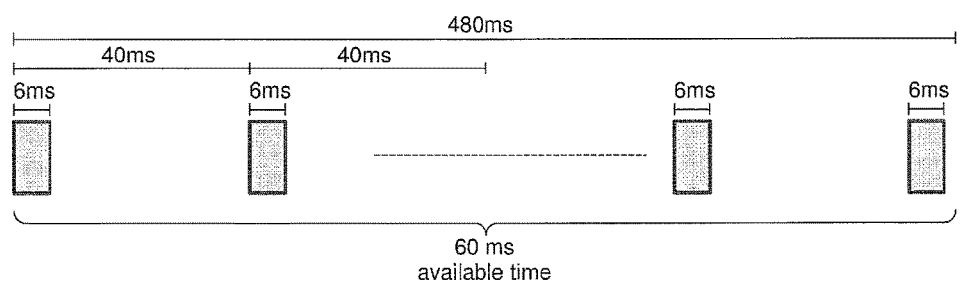
FIG. 6 shows Table 2.

UEs will only support those measurement gap patterns listed in Table 2 (see FIG. 6) that are relevant to its measurement capabilities.

If the secondary measurement gap is configured, another requirement is applied for the concerned inter-frequency measurement as shown in Table 3 (see FIG. 7). For the secondary measurement gap, a different requirement may be applied (i.e. different from normal measurement gaps in Table 2). For example, Gap pattern Id 1 has 4 ms available during 480 ms period because small cell specific new measurement scheme which enables fast measurement is applied.

From the above discussion, it will be appreciated that, in case of a normal s-measure procedure, if the s-measure criteria is not met (the serving cell RSSI is high enough), UE measurement will be halted and the reported neighbouring cell signal level values will be disregarded by the eNB. Therefore the s-measure solution would not be suitable for small cell detection. The problem can be solved if the s-measure criteria is neglected in case of some conditions.

Table 4 (see FIG. 8) shows the achievable advantages and drawbacks of the proposed SCD solutions.

The wording "SCD parameters" has been used in this specification. However, the present arrangement is not to be taken as been restricted to small cell detection within macro-cells. The parameters transmitted from the serving eNB define conditions for measurement for a UE, and hence allow for any manner of handover triggers with the network.

Furthermore, from an UE's point of view, a distinction between a macro eNB and a small cell eNB may be transparent. Thus, in the present specification, it will be appreciated that if the term "macro eNB" is used, features for a macro eNB can be applicable to any eNBs, even small eNBs. Thus, it will be appreciated that the present arrangement includes a wireless telecommunications network comprising a plurality of cells, including an eNB associated with a first cell and an user equipment (UE) in said first cell and in radio communication with the eNB, wherein the radio communication between the eNB and the UE comprises a signal strength level, wherein the UE is operable to make measurements on neighbouring cells if the signal strength level falls below a determined value, wherein the eNB is operable to instruct the UE to make additional measurements on neighbouring cells irrespective of the signal strength level between the eNB and the UE.

The way to perform measurement for a small cell may be assumed to be the same with neighbour cell measurement. As long as the same measurement performing is applied to both small cell and other cells, the small cell detection parameters may be considered as specifying additional conditions for UE measurement opportunity. If the way to perform measurement for small cell is different from the neighbour cell measurement, the SCD parameters may be considered as specifying conditions for measurement opportunities for small cell specific measurement performing.

Some embodiments of the present invention disclose the followings.

According to the present invention there is provided a wireless telecommunications network comprising a plurality of cells, including an eNB associated with a first cell and an UE in said first cell and in radio communication with the eNB, wherein the radio communication between the eNB and the UE comprises a signal strength level, wherein the UE is operable to make measurements on neighbouring cells if the signal strength level falls below a determined value, wherein the eNB is operable to instruct the UE to make additional measurements on neighbouring cells irrespective of the signal strength level between the eNB and the UE.

Preferably the first cell is a macro-cell. It is also preferred that at least some of said neighbouring cells are small cells located within the macro-cell.

Preferably the instruction from the eNB to the UE is broadcast in system information. This has the advantage that all UEs in the cell will receive the information. This may be advantageous when it is desirable to off-load many UEs in a busy area.

Alternatively, although equally preferred, the instruction from the eNB to the UE may be sent using dedicated RRC signalling. It is preferred that the instruction from the eNB to the UE is for the UE to make additional measurements disregarding the s-measure criteria. It is also preferred that the instructions to the UE may involve having the UE make measurements in different time patterns when disregarding the s-measure criteria (for example, the UE could be instructed configure secondary measurement gaps). These instructions may be given in the RRC measurement configuration.

Preferably the UE's mobility is taken into account when the eNB determines whether or not to instruct the UE to make additional measurements. For example, if a UE is travelling quickly, additional measurements may not be made.

According to a second aspect of the present invention there is provided a wireless telecommunications network comprising a first cell with an eNB associated therewith, a second cell located within said first cell and a user equipment (UE) located in said second cell, and in radio communication with the eNB of the first cell, wherein said eNB is operable to instruct said UE to make measurements for detecting the second cell by sending cell detection parameters to said UE.

Preferably the first cell is a macro-cell and the second cell is a small cell. In heterogeneous networks, small cells will be located within macro-cells to aid in overcoming congestion.

It is preferred that the cell detection parameters are UE specific. In other words, the cell detection parameters refer to an individual UE.

Alternatively, and in an equally preferred arrangement, the cell detection parameters may be broadcast to multiple UEs.

Preferably the cell detection parameters are cell specific, such that they are broadcast in a given cell on broadcast system information. This arrangement is advantageous in that it allows UEs to be off-loaded from the macro-cell to the small cell.

Preferably, the UE specific cell detection parameters are sent to the UE from the eNB using radio resource control (RRC) signalling.

In the above preferred arrangements, it is preferred that the cell detection parameters are small cell detection parameters.

It is preferred that a periodicity parameter is provided in the RRC measurement configuration.

The small cell detection parameters may refer to a specific carrier frequency. This frequency will typically be the operating frequency of the small cell. In this arrangement, it will be appreciated that only UEs that can operate on the specific carrier frequency can be off-loaded onto the small cell. It is preferred that the eNB is operable to disable the s-measure for a given frequency. Thus, even if the signal strength of the macro-cell is good, the UE will be prompted to make measurements on the small cell.

Preferably the eNB will only send cell detection parameters to a UE that meets a particular mobility state. It is desirable that, for a UE travelling swiftly through a small cell, the eNB will not try to handover the UE to the small cell.

According to a third aspect of the present invention there is provided a wireless telecommunications network comprising a macro-cell, a small cell located within the macro-cell, and a user equipment (UE) located in said small cell, wherein, said macro-cell comprises an eNB operable to communicate with said UE, wherein said eNB is operable to instruct said UE to make measurements for detecting the small cell by sending small cell detection parameters to said UE.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present arrangement allows for increased throughput in an LTE network, particularly in an arrangement where small cells are available within the coverage area of the macro-cells. The proposed SCD solution enables handover to a small cell and redirect the traffic to it thus releasing the macro eNB from high traffic burdening. The arrangement co-operates with, and is complementary to, normal handover procedure, and therefore is compatible with the existing networks. The present arrangement is of particular use in macro-cells in densely populated areas, where many small cells may be installed within the macro coverage area.

The invention claimed is:

1. A method performed by a user equipment (UE), comprising:
applying a different requirement for a concerned inter-frequency measurement for a specific carrier frequency if the UE receives an instruction from an eNodeB (eNB), wherein:
the instruction is included in a configuration for a measurement object corresponding to a specific carrier frequency;
the different requirement for the concerned inter-frequency measurement is different from a requirement for a normal inter-frequency measurement; and
the configuration for the measurement object includes a field which indicates whether or not the different requirement for the concerned inter-frequency measurement is applied for the specific carrier frequency.

2. The method according to claim 1, wherein the instruction may be sent using dedicated RRC signalling.

3. The method according to claim 1, wherein the instruction includes an additional gap configuration in addition to a measurement gap configuration for the normal inter-frequency measurement.

4. The method according to claim 1, wherein the instruction includes a gap pattern for the concerned inter-frequency measurement.

5. The method according to claim 1, wherein the instruction specifies additional condition for measurement opportunities for the concerned inter-frequency measurement.

* * * * *